(No Model.)
F. VEITH.
VALVE FOR TIRES OF VELOCIPEDES.
No. 575,817. Patented Jan. 26, 1897.
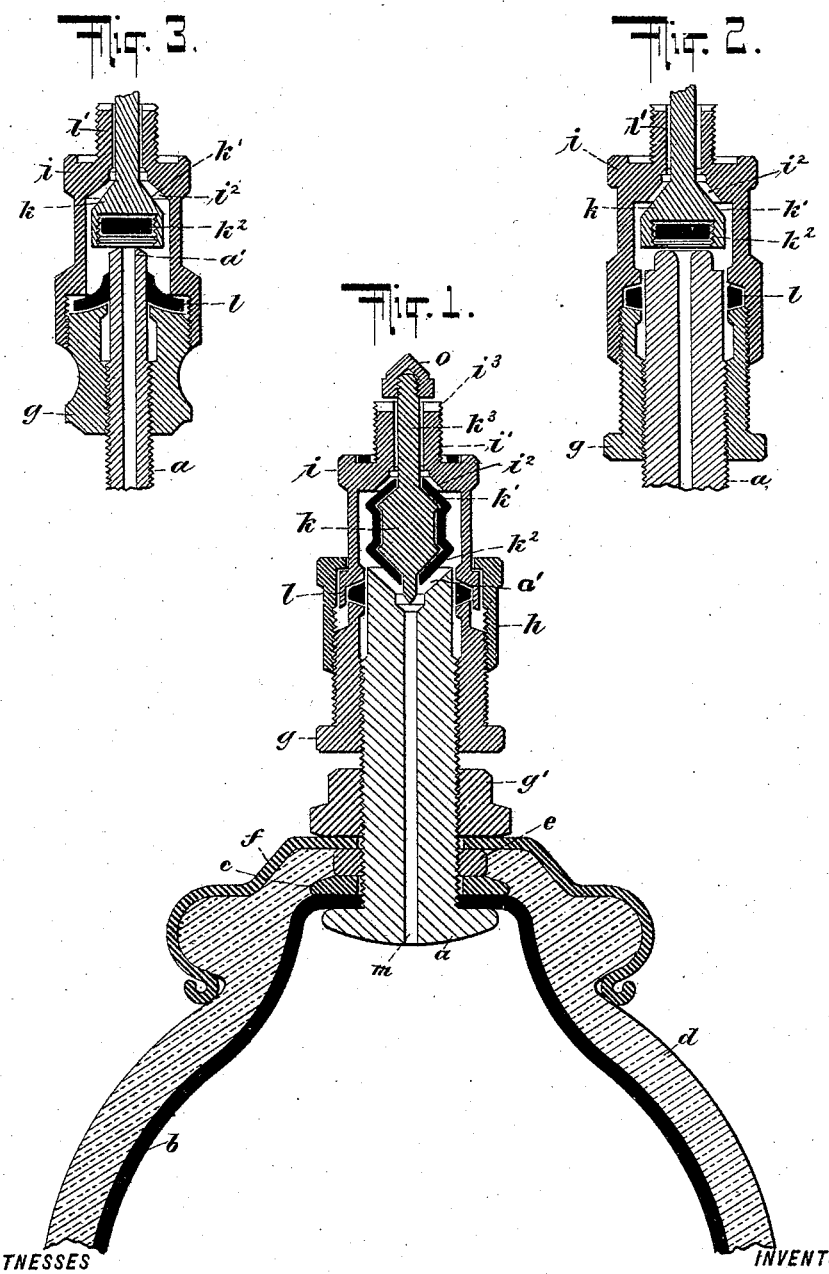

UNITED STATES PATENT OFFICE.

FRIEDRICH VEITH, OF OFFENBACH-ON-THE-MAIN, GERMANY.

VALVE FOR TIRES OF VELOCIPEDES.

SPECIFICATION forming part of Letters Patent No. 575,817, dated January 26, 1897.

Application filed October 2, 1896. Serial No. 607,644. (No model.)

*To all whom it may concern:*

Be it known that I, FRIEDRICH VEITH, of Offenbach-on-the-Main, Germany, have invented Improvements in Valves for the Tires of Velocipedes, of which the following is a specification.

My invention relates to valves for cycle-wheel tires in which the valve is situated outside the valve-socket and is brought down against the outlet-orifice of the said valve-socket.

It has heretofore been necessary in making valves for cycle-wheel tires to take account of the extremely small dimensions requisite for such valves, as it has been customary to construct the valve proper in a tube which passed through the air-tube and rim of the wheel. This valve-tube had to be very small in order that the rim and air-tube might not be too greatly weakened by being pierced with too large a hole.

For obviating and remedying all the aforesaid inconveniences I have devised the valve hereinafter described.

My invention will be understood by referring to the accompanying drawings, in which—

Figure 1 represents a portion of a bicycle tire and wheel-rim and a sectional view of a valve embodying my invention. Figs. 2 and 3 illustrate in section other forms of the valve embodying my invention.

The valve comprises a stem $a$, provided on its outside with a screw-thread and terminating in a valve-socket $a'$. This stem passes through the air-tube $b$, tire $d$, and wheel-rim $f$, being secured therein by a nut $e$ and washer $c$. Surrounding the stem I have shown a nut $g'$, which may, however, be in the form of a packing-gland $g$, which also surrounds and screws upon the exterior surface of the stem, that is to say, the nut $g'$ and packing-gland $g$ may be in one piece. Located above the packing-gland $g$ is a nut or gland $i$. The nut $i$ and gland $g$ are connected by a coupling-nut $h$, and intervening between the nut $i$ and gland $g$ is a packing-ring $l$. Located within the nut $i$ is a valve $k$, having a face $k'$ and a face $k^2$ and a stem $k^3$, which is terminated by a nut $o$, the said stem passing through the bore of a nipple $i'$. The face $k^2$ of the valve $k$ is adapted to coöperate with the valve-seat $a'$ of the stem $a$, and the face $k'$ is adapted to coöperate with the seat $i^2$ of the nut $i$.

The operation of my valve is as follows: The downward movement of the valve $k$ is limited by the nut $o$, resting upon the nipple $i'$, so that by turning the gland $g$ and nut $h$ the valve will be lifted from its seats $a$ and $i^2$ into the position shown in Fig. 1. Air may now be pumped into the apparatus, and when the tire has been inflated screwing the nut with the gland $g$ and nut $h$ down will have the effect of bringing the valve-face $k^2$ against its seat $a'$ in the end of the stem $a$ and the valve-face $k'$ against its seat $i^2$ in the sleeve or nut $i$, so that the valve will be doubly sealed by the two valve-faces $k'$ $k^2$ being pressed firmly against their seats.

It will be observed that as the working parts of the valve are all extraneous to the stem or tube $a$ the stem or tube may be made very small and the working parts of the valve relatively large, so that an efficiently-acting valve may be applied to a wheel-tire without the necessity of piercing too large a hole through the tire-rim.

What I claim, and desire to secure by Letters Patent, is—

In a cycle-wheel valve, the combination of the valve proper $k$ placed externally upon a hollow stem $a$ with the nut or sleeve $g$ embracing the said stem $a$ and with a casing or nut $i$ bearing against the said nut or casing $g$ and an intermediate packing $l$ all arranged so that on a stem or socket of small diameter a comparatively large valve is applied and so that the entire casing can after pumping be screwed toward the escape-opening or valve-seat $a'$ of the stem, thereby producing a perfect and durable closure by the inner end $k^2$ of the valve.

FRIEDRICH VEITH.

Witnesses:
 DEAN B. MASON,
 JEAN GRUND.